United States Patent [19]

Gellert

[11] 4,212,627
[45] Jul. 15, 1980

[54] INJECTION MOLDING VALVE PIN ACTUATOR MECHANISM

[76] Inventor: Jobst U. Gellert, 11 Newton Rd., Brampton, Ontario, Canada

[21] Appl. No.: 969,345

[22] Filed: Dec. 14, 1978

[30] Foreign Application Priority Data

Dec. 8, 1978 [CA] Canada ................................. 317614

[51] Int. Cl.² .............................................. B29F 1/05
[52] U.S. Cl. ................................. 425/564; 222/505; 222/509; 264/328; 425/566; 425/568; 425/DIG. 224; 425/DIG. 227
[58] Field of Search ............... 425/564, 565, 566, 568, 425/DIG. 224, DIG. 225, DIG. 226, DIG. 227; 222/509, 505, 146 HE; 264/328

[56] References Cited

U.S. PATENT DOCUMENTS

| | | | |
|---|---|---|---|
| 471,238 | 3/1892 | Hollis | 222/509 X |
| 2,430,192 | 11/1947 | Silvius | 222/509 X |
| 2,865,050 | 12/1958 | Strauss | 425/564 X |
| 3,371,384 | 3/1968 | Novel | 425/564 X |
| 3,491,408 | 1/1970 | Natkins | 425/564 X |
| 3,535,742 | 10/1970 | Marcus | 425/564 X |
| 3,868,050 | 2/1975 | Gorychka et al. | 222/509 |
| 3,985,486 | 10/1976 | Hendry | 425/564 |
| 4,013,393 | 3/1977 | Gellert | 425/566 |
| 4,078,875 | 3/1978 | Eckardt | 425/564 X |
| 4,095,931 | 6/1978 | Reitan | 425/564 |

FOREIGN PATENT DOCUMENTS

| | | | |
|---|---|---|---|
| 37-7622 | 7/1962 | Japan | 425/564 |
| 46-31749 | 9/1971 | Japan | 425/564 |
| 48-20025 | 6/1973 | Japan | 425/566 |

*Primary Examiner*—Philip Anderson

*Attorney, Agent, or Firm*—George H. Riches & Associates

[57] ABSTRACT

This invention relates to improved mechanism for actuating injection molding valve pins. In one embodiment, the mechanism is located between two parallel rows of valve pins located in a common plane with their driven ends adjacent the mechanism. The mechanism includes a central elongated member which is longitudinally reciprocable and two parallel elongated transversely reciprocable side members, each located between the central member and one of the rows of valve pins. Each of the side members is connected to the central member by a number of spaced pairs of pivotally connected pins and the central member is secured against transverse motion, while the side members are secured against longitudinal motion. Therefore, the side members are reciprocated transversely when the central member is reciprocated longitudinally by a hydraulic cylinder. The side members each have outer faces in contact with the driven ends of the valve pins of one of the rows and the outward motion of the side member actuates the valve pins along their longitudinal axis to a closed position in which the tips of the valve pins are seated in their respective gates. When the central member is returned to the open position, the side members are drawn closer together allowing the valve pins to withdraw under the pressure of the melt. In addition to providing a simplified mechanism for actuating the valve pins in unison, this mechanism has the advantage that the link structure causes the valve pins to move through the minimum distance with maximum force as they approach the closed position. In addition, the opposing forces applied by the side members to the central member balance each other out to a considerable extent.

7 Claims, 5 Drawing Figures

INJECTION MOLDING VALVE PIN ACTUATOR MECHANISM

BACKGROUND OF THE INVENTION

This invention relates generally to injection molding and more particularly to mechanism for actuating injection molding valve pins.

In order to control the flow of pressurized melt through the runner from the molding machine into the cavities, it is necessary that the movement of the valve pin tips into the gates be precisely controlled. Considerable force must be applied to the valve pins to actuate them to closed sealing positions in the gates and when this force is removed, the melt pressure returns the valve pins to the open position.

In the past, valve pins have been actuated by a variety of mechanical mechanisms, one of which utilizes a lever and air cylinder arrangement for each valve pin. These have been found to be subject to malfunction, particularly in high speed applications where the melt pressure may be above 20,000 psi. When opening, the high melt pressure drives the valve pins against the mechanism with considerable impact, causing it to have a reduced operating life. In larger volume applications involving a considerable number of valve pins, the requirement of separate mechanism for each valve pin also has the disadvantage of being very costly to install and maintain.

SUMMARY OF THE INVENTION

Accordingly, it is an object of the present invention to at least partially overcome these disadvantages by providing a simplified valve pin actuating mechanism with which a number of valve pins may be actuated in unison.

To this end, in one of its aspects, the invention provides mechanism for actuating at least one injection molding valve pin along its longitudinal axis comprising; a first member reciprocable in a plane substantially transverse to the longitudinal axis of the valve pin, said first member being secured against substantial movement out of said plane, drive means for reciprocating the first member in said plane, a second member located between the first member and the valve pin, the second member being reciprocable substantially in the direction of the longitudinal axis of the valve pin, but secured against substantial movement in the directions of the reciprocal motion of the first member, and first connector means operably connected between the first and second members, whereby movement of the first member in said plane moves the second member which makes bearing contact with the valve pin and actuates it along its longitudinal axis.

In another of its aspects, the invention further provides mechanism for actuating a plurality of injection molding valve pins along their respective longitudinal axes, the valve pins being located in a common plane and arranged in spaces first and second parallel rows, the valve pins each having a tip and a driven end and are arranged whereby the driven ends of the valve pins of each row are closest to the valve pins of the other row, the mechanism comprising a first elongated member extending parallel to and located midway between the first and second rows of valve pins, the first member being longitudinally reciprocable but secured against transverse motion in said common plane, drive means for longitudinally reciprocating the first member, a second elongated member located between the first member and said first row of valve pins, the second member extending parallel to the first member and in bearing contact with the driven ends of the valve pins of said first row, the second member being secured against longitudinal motion but being transversely reciprocable in said common plane, a first plurality of link means pivotally connected between the first and second members, whereby longitudinal reciprocal motion of the first member causes transverse reciprocal motion of the second member, thereby actuating the valve pins of said first row along their respective longitudinal axes, a third elongated member located between the first member and said second row of valve pins, the third member extending parallel to the first member and in bearing contact with the driven ends of the valve pins of said second row, the third member being secured against longitudinal motion but being transversely reciprocable in said common plane, and a second plurality of link means pivotally connected between the first and third members, whereby longitudinal reciprocal motion of the first member causes transverse reciprocal motion of the third member, thereby actuating the valve pins of said second row along their respective longitudinal axes.

Further obvious advantages of the invention will appear from the following description taken together with the accompanying drawings.

DESCRIPTION OF THE PREFERRED EMBODIMENTS

Figure 1:
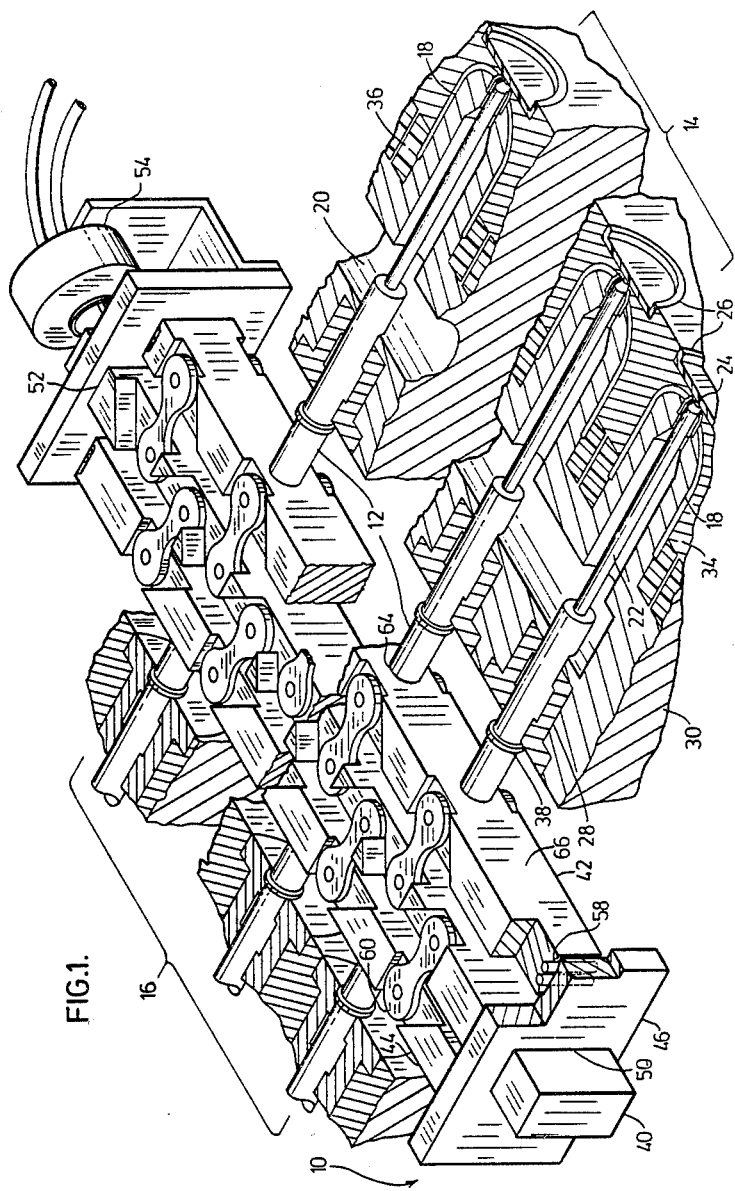
FIG. 1 is a partial perspective view of a valve pin actuating mechanism according to a first embodiment of the invention.

Reference is first made to FIG. 1 which shows valve pin actuating mechanism 10 for actuating a plurality of valve pins 12 located in a common plane arranged in two rows 14, 16 symmetrically located on opposite sides of the mechanism 10. As may be seen, in this application, each valve pin 12 is in a separate nozzle 18 and the pressurized melt flows from the molding machine (not shown) through the main runner 20, around the valve stems 22 and out the gates 24 into the cavities 26. Each valve pin 12 passes through a bushing seal 28 which is seated in the heater cast or main body 30. The main body 30 is separated from the cavity plate 34 by insulation bushing 36. A snap ring 38 is spring-fitted in a groove around each valve pin 12 to prevent it falling out of place during installation.

The valve pin actuating mechanism 10 itself has a first central elongated reciprocal member 40 and second and third elongated reciprocal members 42, 44 extending on either side of the central member between fixed end plates 46, 48. These members are formed of a suitable steel to have sufficient strength and durability and are located in common plane of the valve pins but extend perpendicularly to them. As may be seen in FIG. 1, the ends of the central reciprocal member 40 extend through aperatures 50, 52 in the respective end plates 46, 48 and thus it is free to reciprocate longitudinally but is secured against transverse motion. A hydraulically operated cylinder 54 securely mounted on end plate 48 supplies the power to sequentially reciprocate the first central member 40 along its longitudinal axis.

The second and third slide members 42, 44, on the other hand, are secured against longitudinal motion by the end plates 46, 48, but they are free to reciprocate transversely in the common plane of the valve pins 12 and end roller bearings 58 are provided to reduce frictional losses in doing so. The second and third reciprocal members 42, 44, are connected to the first reciprocal member 40 by spaced pairs of links 60. The links of each pair are located on opposite sides of the reciprocating members and one end of each link is pivotally connected to the first member 40 and the other end is pivotally connected to the respective one of the second and third members 42, 44. As may be seen, the links are inset into the sides of the reciprocating members in a manner which leaves them sufficient room to pivot as the central member 40 moves longitudinally. The valve pins 12 each have a tip 62 and a driven end 64 and the actuating mechanism 10 is located between the rows of valve pins 14, 16 with the driven ends 64 of the valve pins 12 in row 14 in contact with the flat face 66 of second member 42 and with the driven ends 64 of the valve pins 12 in row 16 similarly in contact with a flat face (not shown) of third member 44.

Figure 2:
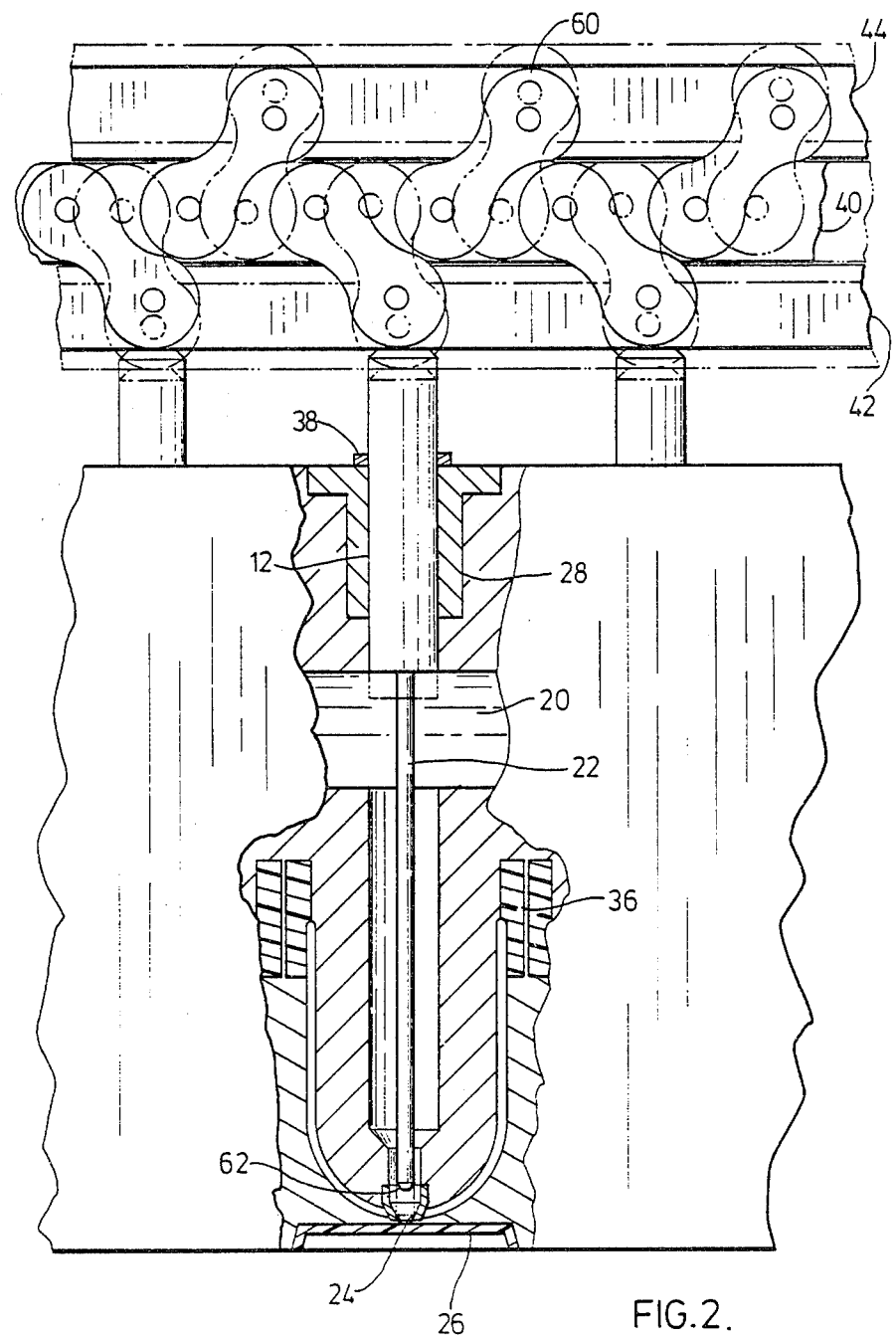
FIG. 2 is a partial sectional view taken along line II—II, in FIG. 1 showing the mechanism in the open and closed positions.

In use, it will be appreciated that longitudinal movement of the first reciprocal member 40 will result in transverse movement of the second and third members 42, 44. For instance, movement of the first member 40 to the left from the closed position shown in FIG. 1 will necessarily require the links 60 to pivot and draw the second and third members closer to the first member. Then if the first member is pulled back to its original position, the first and second members are again forced outwardly. Thus, when molten pressurized melt is injected into the main runner 20, in the closed position its flow past the valve stems 22 is stopped by the valve pin tips 62 being received in the gates 24. After the mold has opened to eject the previously formed product and closed again, the pneumatic cylinder 54 is actuated by control valves (not shown) to move the first reciprocal member 40 from the closed position towards the left to the open position. As described above, this causes the second and third members 42, 44 to move transversely to a position closer together which allows the valve pins to be moved by the pressure of the melt from the closed to the open positions with their driven ends 64 at rest against the respective flat faces of the second and third members as seen in FIG. 2. After sufficient melt has passed through the gates 24 to fill the cavities 26, the control valves are energized to actuate the pneumatic cylinder 54 to draw first member 40 back to th closed position which forces the second and third side members 42, 44 outwardly. Their outer faces, in turn, bear on the driven ends 64 of the respective rows of valve pins 12 causing them to move along their longitudinal axes to the closed positions in which their tips 62 are seated in the gates 24. With all of the valve pins moving in unison, this cycle may be repeated very rapidly. In addition to providing simplified structure for actuating the valve pins in unison, this mechanism with the valve pins arranged in the opposing row configuration shown provides the important advantage that the transverse forces applied on closing to the first central members 40 through the links from the second and third side members are in opposite directions and, therefore, to a considerable extent, cancel each other out, which facilitates movement of the member and reduces wear. It will be appreciated that a sufficient number of spaced pairs of links must be provided to avoid substantial transverse bending of the second and third members by these froces.

Figure 3:
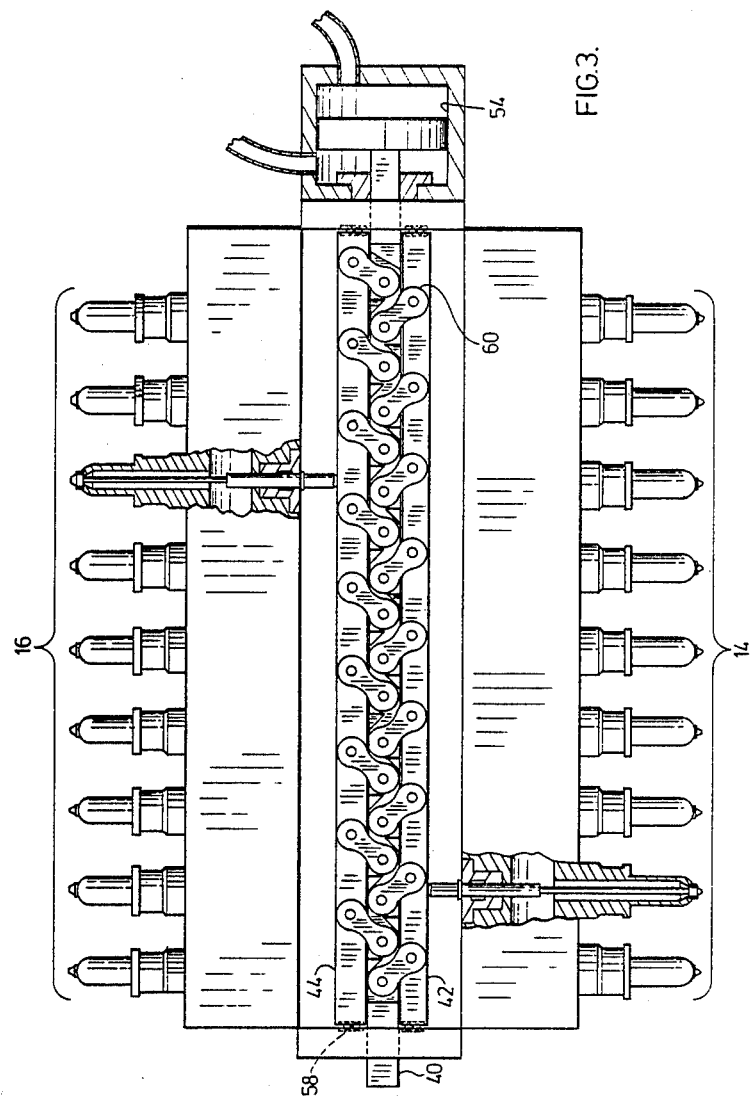
FIG. 3 is a partial sectional view showing the valve pin actuating mechanism according to the first embodiment of the invention used in an injection molding system having a large number of gates.
Figure 4:
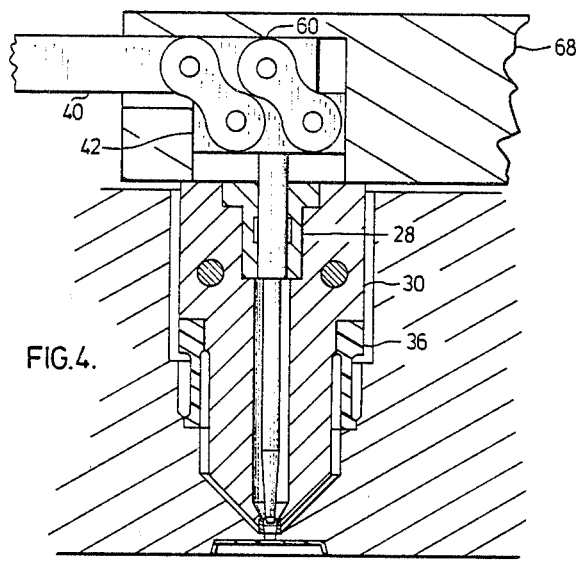
FIG. 4 is a sectional view showing a valve pin actuating mechanism in the open position according to a second embodiment of the invention used in an injection molding system having only a single gate.
Figure 5:
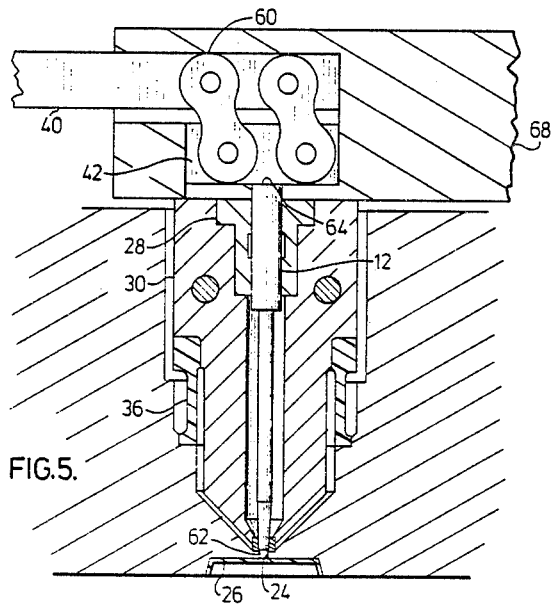
FIG. 5 is a sectional view similar to FIG. 4 showing the mechanism in the closed position.

Referring now to FIGS. 4 and 5, they illustrate a second embodiment of the invention in which only a single valve pin is actuated by the mechanism. As many of the elements shown are identical to those in FIGS. 1-3, common features are described and illustrated using the same reference numerals. The valve pin actuating mechanism 10 is received in a fixed member 68 positioned adjacent heater cast 30. The mechanism has a first elongated reciprocal member 40 and a second elongated reciprocal member 42 having a flat face 66 which bears on the driven end 64 of the valve pin 14.

The first member 40 is connected to a driving mechanism such as a pneumatic cylinder (not shown) which will reciprocate it longitudinally in the manifold 68. The second member 42, on the other hand, is prevented by the structure of the fixed member 68 from moving longitudinally, but is free to reciprocate transversely. The first and second members 40, 42 are connected by two spaced pairs of links 60, one of each pair of links being connected on opposite sides of the members 40, 42. Each link is pivotally connected at one end to the first member 40 and at the other end to second member 42.

The operation of this embodiment of the invention is similar to that of the first embodiment described above. With the mechanism 10 in the open position shown in FIG. 4, the driving mechanism is actuated to slide the first member 40 to the right. This movement, in turn, pivots the links 60 which causes the second member 42 to move away from the first member. This motion of the second member 42 applies pressure to the driven end 64 of the valve pin 14, causing it to move along its longitudinal axis until its tip 62 is tightly seated in the gate 24, as shown in FIG. 5. After the mold has opened to eject the molded product and closed again, the driving mechanism slides the first member 40 back to the left which draws the second member closer to it under the pivotal action of the links 60. This allows the valve pin 14 to move under the pressure of the melt to open the gate 24, permitting the melt to flow into the cavity. After the cavity is filled, the mechanism is again actuated to the closed position and this process is repeated at speeds up to about twenty times per minute.

This mechanism provides the important advantage that the links 60 may be oriented as shown so that they approach dead center in the closed position whereby the force applied to the valve pin or pins increases and the displacement decreases as the closed seated position is approached. This provides an improved seal with a minimum of gate and valve pin tip wear. Furthermore, allowance may be made for some valve pin wear by having it or them close with the links slightly off the dead center position so that the first member 40 is moved by the cylinder until the tightly seated position is reached, even if there has been some wear.

Although this invention has been described in respect to two particular embodiments, it is not to be construed in a limiting sense. Many variations and modifications will now occur to those skilled in the art. In particular, it will be apparent that the actuator mechanism according to the invention may be used with a variety of mold configurations.

What I claim is:

1. Mechanism for actuating at least one injection molding valve pin along its longitudinal axis comprising;
   (a) a first member reciprocable in a plane substantially transverse to the longitudinal axis of the valve pin, said first member being secured against substantial movement out of said plane,
   (b) drive means for reciprocating the first member in said plane,
   (c) a second member located between the first member and the valve pin, the second member being reciprocable substantially in the direction of the longitudinal axis of the valve pin, but secured against substantial movement in the directions of the reciprocal motion of the first member, and
   (d) first connector means operably connected between the first and second members;
   whereby movement of the first member in said plane moves the second member which makes bearing contact with the vale pin and actuates it along its longitudinal axis 2. Mechanism as claimed in claim 1, wherein the connector means are pivotally connected to the first member and to the second member.

3. Mechanism as claimed in claim 1 wherein a plurality of valve pins are located in a first row, each having a tip and a driven end located in a common relationship, the first member is elongated and is located in the plane of the valve pins of said first row, the first member extending parallel to but spaced from the driven ends of the valve pins of said first row, and the second member is also elongated and is located between the first member and said first row of valve pins, the second member extending parallel to the first member and in bearing contact with the driven ends of the valve pins of said first row, whereby movement of the second member when the first member is reciprocated actuates the valve pins of said first row along their respective longitudinal axes.

4. Mechanism as claimed in claim 3 wherein a second row of valve pins is located in a common plane with said first row of valve pins, said second row extending parallel to but spaced from said first row, the valve pins of said second row each having a driven end in opposed relationship to the driven ends of the valve pins of said first row, further comprising:
   (e) a third elongated member located between the first member and said second row of valve pins, the third member extending parallel to the first member and in bearing contact with the driven ends of the valve pins of said second row, the third member being reciprocable substantially in the directions of the longitudinal axes of the valve pins, but secured against substantial movement in the directions of the reciprocal motion of the first member, and
   (f) second connector means operably connected between the first and third members, whereby movement of the first member in said plane moves the third member which actuates the valve pins of said second row along their respective axes.

5. Mechanism as claimed in claim 4 wherein each of the first and second connector means comprises a plurality of pairs of links spaced along the members, the links of each pair located on opposite sides of the member, each link pivotally connected at one end to the first member and at the other end to the respective one of the second and third members.

6. Mechanism as claimed in claim 5 wherein the links are oriented to approach a dead center position as the valve pins approach a closed position.

7. Mechanism for actuating a plurality of injection molding valve pins along their respective longitudinal axes, the valve pins being located in a common plane and arranged in spaces first and second parallel rows, the valve pins each having a tip and a driven end and are arranged whereby the driven ends of the valve pins of each row are closest to the valve pins of the other row, the mechanism comprising:
   (a) a first elongated member extending parallel to and located midway between the first and second rows of valve pins, the first member being longitudinally reciprocable but secured against transverse motion in said common plane,
   (b) drive means for longitudinally reciprocating the first member,
   (c) a second elongated member located between the first member and said first row of valve pins, the second member extending parallel to the first member and in bearing contact with the driven ends of the valve pins of said first row, the second member being secured against longitudinal motion but being transversely reciprocable in said common plane,
   (d) a first plurality of link means pivotally connected between the first and second members, whereby longitudinal reciprocal motion of the first member causes transverse reciprocal motion of the second member, thereby actuating the valve pins of said first row along their respective longitudinal axes,
   (e) a third elongated member located between the first member and said second row of valve pins, the third member extending parallel to the first member and in bearing contact with the driven ends of the valve pins of said second row, the third member being secured against longitudinal motion but being transversely reciprocable in said common plane, and
   (f) a second plurality of link means pivotally connected between the first and third members, whereby longitudinal reciprocal motion of the first member causes transverse reciprocal motion of the third member, thereby actuating the valve pins of said second row along their respective longitudinal axes.

* * * * *